June 26, 1951 F. L. HILL 2,558,519

THERMIONIC VALVE AMPLIFIER

Filed Nov. 23, 1948

INVENTOR
FRANK L. HILL
BY Paul Kolisch
ATTORNEY

Patented June 26, 1951 2,558,519

UNITED STATES PATENT OFFICE 2,558,519

THERMIONIC VALVE AMPLIFIER

Frank Lawrence Hill, Hayes, England, assignor to Cinema-Television Limited, London, England, a corporation of England Application November 23, 1948, Serial No. 61,535
In Great Britain November 25, 1947

3 Claims. (Cl. 179—171)

Figure 1:
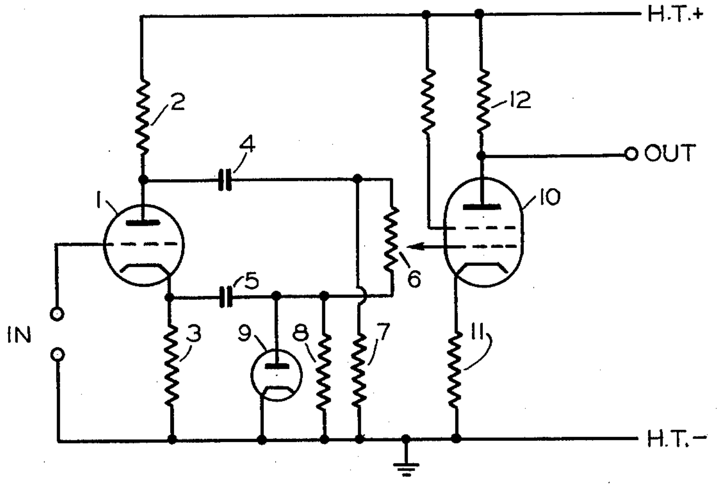

This invention relates to improvements in thermionic valve amplifiers and is especially concerned with amplifiers of the type which are required to produce substantially zero phase shift in the amplified signal and in which the output from the amplifier will not exceed a chosen value no matter what the amplitude of the input signal.

Amplifiers having a limited output for increasing values of input signal are well known in the art; the desired effect being usually obtained by the use of so-called Automatic Gain Control (A. G. C.). In amplifiers employing A. G. C. a proportion of the output from an amplifying stage is rectified and smoothed to produce a substantially unidirectional potential which is applied to render the grid of some preceding valve in the amplifier more negative with respect to its cathode and thus to reduce the overall gain of the amplifier. The controlled valve will, of course, be of the so-called variable-mu type in which the slope of the grid-voltage/anode current characteristic is reduced when an increasing negative grid bias is applied.

The operation of circuits of this type is satisfactory for some applications, but unsatisfactory for other purposes, for the following reason: It is well known that the output from any rectifier to which an alternating potential is applied contains components at the frequency of the said alternating signal and at harmonics thereof. In A. G. C. systems it is usual to reduce these components to a small value by means of filter circuits. This is comparatively readily effected when the frequency of the rectified signal is high, but when the signal is of comparatively low frequency the process becomes difficult and results in the system having an undesirably long time constant. This causes a delay in the operation of the A. G. C. system which may render the amplifier liable to oscillation at a frequency determined by the time constant of the A. G. C. system.

The present invention seeks to overcome the above-mentioned difficulty by providing an amplifier of the type described in which potentials appearing at the output of a valve are rectified and employed to influence the grid-cathode potential of a subsequent valve in such a manner as to reduce the gain of the said subsequent valve when the amplitude of the input signal increases. In order that such a system shall be practicable it is necessary to reduce the amplitude of the alternating component of the signal applied to the grid of the subsequent (controlled) valve in relation to the direct control potential derived by rectifying the alternating component. It is not possible to effect this diminution of the signal amplitude by using a normal potentiometer network comprising a series resistance and shunt capacity, owing to the previously-stated requirement that the amplifier shall introduce no (or 180°) phase shift in the signal.

According to the present invention there is provided a thermionic valve amplifier comprising at least one variable-mu thermionic valve having a grid-cathode circuit into which are introduced firstly a signal consisting of an alternating component and a direct component derived by rectification of the said alternating component and, secondly, a signal comprising an alternating component of identical frequency but opposite phase to said first alternating component, whereby the proportion of the alternating component to the direct component effective at the grid of said valve is reduced.

According to a feature of the present invention there is provided a thermionic valve having both anode and cathode load impedances, signals derived from the anode of said valve being arranged to be applied by way of a condenser to one end of a resistor and signals derived from the cathode of said valve being applied by way of a condenser to the other end of said resistor a second, variable-mu, thermionic valve having its grid supplied with signals from a point on said resistor and means for applying also to said grid a potential derived by rectifying one of said signals.

Figure 2:
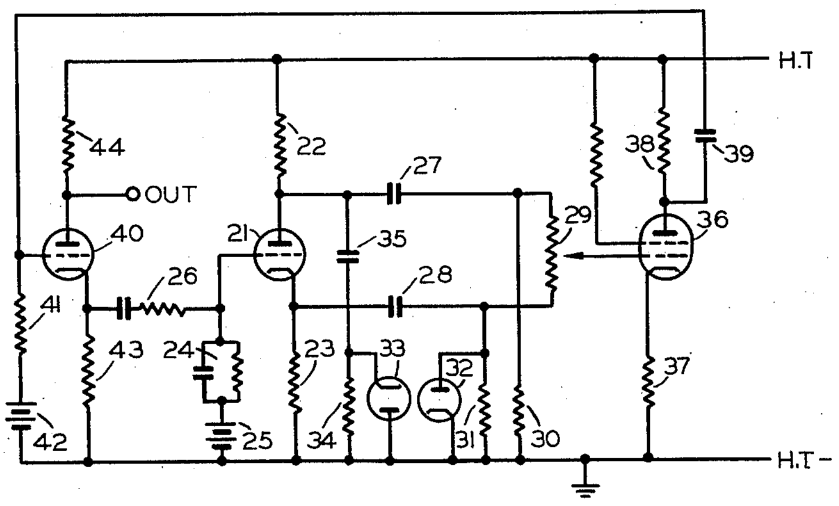

In order that the nature of the present invention may be more readily understood, reference is now made to the drawings. These drawings comprise Figs. 1 and 2, of which:

Fig. 1 shows one embodiment of an amplifier in accordance with the invention; and Fig. 2 illustrates a resistance-capacity coupled oscillator embodying the present invention.

In Fig. 1, signals to be amplified are applied to the grid of a triode valve 1 having anode and cathode load resistors 2, 3. Signals appearing across resistor 2 are applied through condenser 4 to one end of a resistor 6, which has its center point effectively earthed by reason of the equal resistors 7, 8 connected severally between its ends and earth. The junction of resistors 6 and 8 is fed with signals appearing across the cathode load resistor 3, by way of condenser 5. Resistor 8 is shunted by a thermionic diode 9, for reasons shown below.

A tapping on resistor 6 supplies a signal to the grid of a variable-mu valve 10 having a bias resistor 11 connected in its cathode lead and a load resistor 12 connected in its anode lead.

The direct potential on the grid of the valve 10 is determined in part by the potential drop across resistor 11 and in part by the potential developed across resistor 8 owing to the rectifying action of the diode 9. This latter potential increases with increased signal output from valve 1, so that the gain of valve 10 is decreased as the amplitude of signal input to the amplifier increases, thus tending to reduce the gain of the amplifier for increased signal inputs.

The signal potential applied to the grid of the valve 10 is determined both in sense and in magnitude by the position of the tapping on the resistor 6. If this tapping be moved upwards from the center, an increasing signal of opposite sense to that applied to the amplifier will be applied to the grid of valve 10, while if the tapping be moved downwards from the center an increasing signal of similar sense to that applied to the amplifier will be delivered to valve 10. The position of the tapping is, in practice, chosen so as to apply to valve 10 a signal of the desired sense and of amplitude small in relation to the direct potential developed across the resistor 8.

An amplifier constructed as above described has an input/output characteristic which rises to a maximum from which it thereafter descends, while at no point on the characteristic does overloading or phase distortion occur.

Fig. 2 illustrates an oscillator employing the present invention in order to stabilize the amplitude of the output signal. A triode valve 21 has equal anode and cathode load resistors 22, 23. The signal developed across resistor 22 is applied through condenser 27 to one end of a resistor 29, while the signal developed across resistor 23 is applied through condenser 28 to the other end of resistor 29. The ends of resistor 29 are each earthed through equal resistors 30, 31. Resistor 31 is shunted by a thermionic diode valve 32, while a similar diode resistor combination 33, 34 is fed from the anode of the valve through condenser 35. The grid of the next valve, 36, is fed from a tapping on the resistor 29. The circuit so far described is identical with that of Fig. 1 with the exception of the diode 33 and its associated components. This is included to prevent an out-of-balance condition which arises when a single diode only is used and may result in undesired signals being produced.

Valve 36 has a cathode bias resistor 37 and an anode load resistor 38 from which an output is taken by way of condenser 39 and applied to the grid of the triode valve 40. The grid circuit of this valve is completed by a resistor 41 and a source of potential 42, the latter being necessitated by the presence of a load resistor 43 in the cathode circuit of the valve, which raises the potential of the cathode very considerably above the value necessary to bias the grid of the valve to the correct working point. The source of potential 42 is connected so as to oppose the potential developed across the resistance 43 and is of such value as to produce the correct working bias on the grid of valve 40.

The output taken across the cathode load resistor 43 is fed through a phase shifting network consisting of a series arm 26 and a shunt arm 24 to the grid of valve 21. The shunt arm 24 is returned to earth by way of a source of potential 25, which serves the purpose of providing the correct working bias on the grid of valve 21 in view of the cathode load resistor 23, as already explained in relation to valve 40.

Valve 40 has also an anode load resistor 44, across which an output signal is derived and may be used for any purpose.

What is claimed is:

1. In combination, a thermionic valve having an anode load impedance and a cathode load impedance, a resistor having one end connected via a condenser to said anode load impedance, a second condenser connecting the other end of said resistor to the cathode load impedance of said valve, a variable-mu thermionic valve having a grid coupled with a point on said resistor, and a rectifier in the output circuit of the first-mentioned valve also connected with the grid of the variable-mu thermionic valve.

2. Combination according to claim 1, in which two additional equal resistors are connected severally between each end of said first mentioned resistor and earth.

3. Combination according to claim 2, in which said variable-mu thermionic valve has a bias resistor connected in its cathode lead and a load resistor connected in its anode lead.

FRANK LAWRENCE HILL.

REFERENCES CITED

The following references are of record in the file of this patent:

UNITED STATES PATENTS

| Number | Name | Date |
|---|---|---|
| 2,319,663 | Crowley | May 18, 1943 |
| 2,323,211 | Faltico | June 29, 1943 |
| 2,444,084 | Artzt | June 29, 1948 |
| 2,446,821 | Gassel et al. | Aug. 10, 1948 |